United States Patent [19]

Halasa et al.

[11] Patent Number: 5,679,751
[45] Date of Patent: Oct. 21, 1997

[54] SOLUTION POLYMERIZATION PROCESS FOR SYNTHESIS OF STYRENE-BUTADIENE OR STYRENE-ISOPRENE RUBBER

[75] Inventors: Adel Farhan Halasa, Bath; Laurie Elizabeth Austin, Hartville; Wen-Liang Hsu, Cuyahoga Falls; Bill Bud Gross, Stow, all of Ohio

[73] Assignee: The Goodyear Tire & Rubber Company, Akron, Ohio

[21] Appl. No.: 599,542

[22] Filed: Feb. 12, 1996

[51] Int. Cl.$^6$ .............................. C08F 4/48; C08F 236/10
[52] U.S. Cl. ........................... 526/174; 526/173; 526/337; 526/340
[58] Field of Search ................................. 526/174, 173, 526/340

[56] References Cited

U.S. PATENT DOCUMENTS

| | | | |
|---|---|---|---|
| 3,294,768 | 12/1966 | Wofford | 526/174 |
| 3,496,154 | 2/1970 | Wofford | 526/174 |
| 3,775,369 | 11/1973 | Uraneck et al. | 526/183 |
| 5,284,927 | 2/1994 | Hsu et al. | 526/180 X |
| 5,393,721 | 2/1995 | Kitamura et al. | 526/174 X |

*Primary Examiner*—Fred Teskin
*Attorney, Agent, or Firm*—Alvin T. Rockhill

[57] ABSTRACT

The subject invention relates to a technique for synthesizing rubbery copolymers of styrene and butadiene and/or isoprene. These rubbers exhibit an excellent combination of properties for utilization in high performance tire tread rubber compounds. The subject invention specifically discloses a process for preparing a styrene-butadiene rubber (SBR) which comprises: copolymerizing from about 30 weight percent to about 55 weight percent styrene and from about 45 weight percent to about 70 weight percent 1,3-butadiene in an alkane solvent, such as hexane, at a temperature which is within the range of about −10° C. to about 150° C. in the presence of (a) an alkali metal alkoxide, and (b) an organolithium compound, wherein the molar ratio of the alkali metal alkoxide to the organolithium compound is within the range of about 0.01:1 to about 1:1. The subject invention further discloses a process for preparing a rubbery copolymer of styrene and isoprene having an excellent combination of properties for use in making tire treads by a solution polymerization process which comprises: copolymerizing from about 30 weight percent to about 55 weight percent styrene and from about 45 weight percent to about 70 weight percent isoprene in an alkane solvent at a temperature which is within the range of about −10° C. to about 150° C. in the presence of (a) an alkali metal alkoxide, and (b) an organolithium compound, wherein the molar ratio of the alkali metal alkoxide to the organolithium compound is within the range of about 0.01:1 to about 1:1.

10 Claims, No Drawings

SOLUTION POLYMERIZATION PROCESS FOR SYNTHESIS OF STYRENE-BUTADIENE OR STYRENE-ISOPRENE RUBBER

BACKGROUND OF THE INVENTION

It is highly desirable for tires to have good wet skid resistance, low rolling resistance, and good wear characteristics. It has traditionally been very difficult to improve a tire's rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

It is frequently desirable for styrene-butadiene rubber which is utilized in tire tread compounds to have a high level of vinyl content (1,2-microstructure). It is also generally desirable for the repeat units which are derived from styrene to be randomly distributed throughout the polymer chains of the rubber. To achieve these objectives styrene-butadiene rubbers are often synthesized by solution polymerization which is conducted in the presence of one or more modifying agents. Such modifying agents are well known in the art and are generally ethers, tertiary amines, chelating ethers or chelating amines. Tetrahydrofuran, tetramethylethylene diamine (TMEDA), and diethylether are some representative examples of modifying agents which are commonly utilized.

U.S. Pat. No. 5,331,035 discloses a process for the synthesis of a random copolymer by the nonaqueous dispersion random polymerization of a mixture of 30% to 65% by weight of a conjugated diolefin monomer, preferably butadiene, and 35% to 70% by weight of a vinyl substituted aromatic monomer, preferably styrene, in a liquid aliphatic hydrocarbon dispersion medium with an anionic initiator catalyst system in the presence of a block copolymeric dispersing agent which is prepared in situ. U.S. Pat. No. 5,331,035 discloses that at least one block of the dispersing agent is prepared prior to the dispersion polymerization in situ during the dispersion copolymerization and that the block agent that is prepared in situ has the polymer structure of the random copolymer. U.S. Pat. No. 5,331,035 further indicates that modifying agents such as ethers, tertiary amines, chelating ether or amines, and sodium or potassium alkoxides or alkyls, may be added to increase the 1,2-addition reaction of the diene monomer and that these modifying agents may be employed at a molar ratio of the modifier to anionic initiator which is within the range of from 1:10 to 100:1.

U.S. Pat. No. 5,284,927 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) tripiperidino phosphine oxide, (b) an alkali metal alkoxide and (c) an organolithium compound.

U.S. Pat. No. 5,221,716 discloses a process for the synthesis of medium vinyl polybutadiene utilizing secondary-butyl lithium as an initiator and potassium t-amylate as a modifier. U.S. Pat. No. 5,221,716 indicates that in such polymerizations medium vinyl polybutadiene can be made utilizing any molar ratio of the lithium initiator to potassium t-amylate which is within the range of about 0.1:1 to about 1:1, and that in most cases, the medium vinyl polybutadiene will be synthesized using a molar ratio of lithium initiator to potassium t-amylate which is within the range of about 0.15 to about. 0.60.

U.S. patent application Ser. No. 08/505,441, filed on Jul. 21, 1995, now U.S. Pat. No. 5,623,035 discloses a process for the synthesis of rubbery polymers which have a broad molecular weight distribution and which are particularly useful in tire tread rubber compounds, said process comprising the polymerization of at least one conjugated diolefin monomer in an organic solvent in the presence of a catalyst system which is comprised of (a) a dialkyl magnesium compound and (b) an alkali metal containing compound selected from the group consisting of alkali metal alkoxides, alkali metal phenoxides, alkali metal sulfoxides, alkali metal sulfonates, alkali metal carboxylates, alkyl substituted alkali metal phenoxides, alkali metal alkylamines, and alkali metal dialkylamines; wherein the molar ratio of the alkali metal containing compound to the dialkyl magnesium compound is within the range of about 6:1 to about 1:5. U.S. patent application Ser. No. 08/505,441 further indicates that in cases where rubbery copolymers containing α-methylstyrene are being synthesized that the alkali metal in the alkali metal containing compound will normally be potassium, rubidium, or cesium with cesium being most preferred.

U.S. Pat. No. 5,534,592, discloses a process for preparing high vinyl polybutadiene rubber which comprises: polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.01:1 to about 20:1.

SUMMARY OF THE INVENTION

It has been unexpectedly found that styrene-butadiene rubber which has styrene repeat units distributed essentially uniformly and randomly throughout its polymer chains can be synthesized by employing a lithium initiator while utilizing a molar ratio of sodium alkoxide to the lithium initiator which is within the range of about 0.01:1 to about 0.1:1. The molar ratio of the sodium alkoxide to the lithium initiator will more typically be within the range of about 0.02:1 to about 0.08:1.

The present invention more specifically discloses a process for preparing a rubbery copolymer of styrene and butadiene having an excellent combination of properties for use in making tire treads which comprises: copolymerizing styrene and 1,3-butadiene in an organic solvent at a temperature which is within the range of about −10° C. to about 150° C. in the presence of (a) an alkali metal alkoxide, and (b) an organolithium compound, wherein the molar ratio of the alkali metal alkoxide to the organolithium compound is within the range of about 0.01:1 to about 0.1:1.

SBR which contains more than about 28% styrene cannot normally be prepared by solution polymerization in aliphatic solvents, such as n-hexane, because of diminishing solubility in such aliphatic solvents with increasing levels of styrene. This is unfortunate because n-hexane is a highly preferred solvent for industrial applications due to its ease of removal. However, it has also been unexpectedly determined that SBR having a styrene content which is within the range of about 30% to about 55% can be synthesized by solution polymerization in certain alkane solvents, such as n-hexane, without encountering solubility problems in the presence of a molar ratio of alkali metal alkoxide to organolithium initiator which is within the range of about 0.01:1 to about 1:1. The molar ratio of alkali metal alkoxide to organolithium initiator will typically be within the range of about 0.1:1 to about 0.5:1.

The subject invention more specifically discloses a process for preparing a rubbery polymer of styrene and butadiene (SBR) having an excellent combination of properties for use in making tire treads by a solution polymerization process which comprises: polymerizing from about 30 weight percent to about 55 weight percent styrene and from about 45 weight percent to about 70-weight percent 1,3-butadiene in an alkane solvent at a temperature which is within the range of about −10° C. to about 150° C. in the presence of (a) an alkali metal alkoxide, and (b) an organolithium compound, wherein the molar ratio of the alkali metal alkoxide to the organolithium compound is within the range of about 0.01:1 to about 1:1.

The present invention further reveals a process for preparing a rubbery copolymer of styrene and isoprene having an excellent combination of properties for use in making tire treads by a solution polymerization process which comprises: copolymerizing from about 30 weight percent to about 55 weight percent styrene and from about 45 weight percent to about 70 weight percent isoprene in an alkane solvent at a temperature which is within the range of about −10° C. to about 150° C. in the presence of (a) an alkali metal alkoxide, and (b) an organolithium compound, wherein the molar ratio of the alkali metal alkoxide to the organolithium compound is within the range of about 0.01:1 to about 1:1.

DETAILED DESCRIPTION OF THE INVENTION

This invention relates to a solution polymerization technique for preparing styrene-butadiene rubber (SBR) which is, of course, comprised of repeat units which are derived from styrene and 1,3-butadiene. The monomer charge composition utilized in the synthesis of the SBR will typically contain from about 5 weight percent to about 55 weight percent styrene and from about 45 weight percent to about 95 weight percent 1,3-butadiene. This invention offers the advantage of being capable of producing SBR containing from about 30 weight percent to about 55 weight percent styrene and from about 45 weight percent to about 70 weight percent butadiene without encountering loss of solubility in alkane solvents, such as n-hexane. Such SBR offers unique and highly desirable characteristics in tire tread compounds and it is accordingly most preferred for the monomer charge composition to contain from about 30 weight percent to about 55 weight percent styrene and from about 45 weight percent to about 70 weight percent butadiene. The monomer charge composition will typically contain from about 35 weight percent to about 50 weight percent styrene and from about 50 weight percent to about 65 weight percent butadiene. Since the polymerizations of this invention are normally carried out to completion, the ratio of monomers in the charge composition will be equivalent to the bound ratio of monomers in the SBR.

In cases where SBR having a bound styrene content of less than about 30% is being prepared the polymerizations of the present invention will be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In cases where SBR having a bound styrene content of greater than about 30% is being prepared the polymerizations of the present invention will be carried out in an alkane solvent. The alkane solvent will normally contain from 5 to about 15 carbon atoms per molecule and will be a liquid under the conditions of the polymerization. Some representative examples of alkane solvents which can be employed include pentane, hexane, heptane, octane, nonane, decane, undecane, docecane, pentadecane, 3-methylpentane, 2-methylpentane, 2,3-dimethylbutane, and 2,2-dimethylbutane. Hexane, heptane, 3-methylpentane, 2-methylpentane, 2,3-dimethylbutane, and 2,2-dimethylbutane are preferred alkane solvents which can be employed with hexane being the most preferred.

In the solution polymerizations of this invention, there will normally be from about 5 to about 35 weight percent monomers in the polymerization medium. The polymerization medium is, of course, comprised of the organic solvent, the 1,3-butadiene monomer, and the styrene monomer. In most cases, it will be preferred for the polymerization medium to contain from 10 to 30 weight percent monomers. It is generally more preferred for the polymerization medium to contain 20 to 25 weight percent monomer.

Polymerization is started by adding an organolithium compound and an alkali metal alkoxide to the polymerization medium. Such polymerizations can be carried out utilizing batch, semi-continuous, or continuous techniques. In a continuous process additional monomer, lithium initiator, alkali metal alkoxide, and solvent are continuously added to the reaction vessel being utilized. The polymerization temperature utilized will typically be within the range of about −10° C. to about 150° C. It is normally preferred for the polymerization medium to be maintained at a temperature which is within the range of about 30° C. to about 100° C. throughout the polymerization. It is typically most preferred for the polymerization temperature to be within the range of about 50° C. to about 80° C. The pressure used will normally be sufficient to maintain a substantially liquid phase under the conditions of the polymerization reaction.

The polymerization is conducted for a length of time sufficient to permit substantially complete polymerization of monomers into SBR. In other words, the polymerization is normally carried out until high conversions are realized. The polymerization can then be terminated using a standard procedure.

The organolithium compound which can be utilized includes organomonolithium compounds and organo multifunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5,-trilithiopentane, 1,5,15- trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of lithium initiator utilized will vary from one organolithium compound to another and with the molecular weight that is desired for the styrene-butadiene rubber being synthesized. As a general rule in all anionic polymerizations, the molecular weight (Mooney viscosity) of the polymer produced is inversely proportional to the amount of catalyst utilized. An amount of organolithium initiator will be selected to result in the production of an styrene-butadiene rubber having a Mooney viscosity which is within the range of about 50 to about 140. As a general rule, from about 0.01 phm (parts per hundred parts by weight of monomer) to 1 phm of the lithium initiator will be employed. In most cases, from 0.01 phm to 0.1 phm of the lithium catalyst will be employed with it being preferred to utilize 0.025 phm to 0.07 phm of the lithium catalyst.

The alkali metal in the alkali metal alkoxide can be sodium, potassium, rubidium or cesium. It is typically preferred for the alkali metal to be sodium or potassium with sodium being most preferred. The alkali metal alkoxide which can be utilized will normally be of the formula MOR, wherein M represents the alkali metal and wherein R represents an alkyl group containing from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Sodium amylate is a highly preferred alkali metal alkoxide which can be utilized in the catalyst systems of this invention.

In the catalyst systems of this invention, the molar ratio of the alkali metal alkoxide to the organolithium compound will typically be within the range of about 0.01:1 to about 1:1. The microstructure and glass transition temperature of the SBR being synthesized can be controlled by manipulating the ratio of alkali metal alkoxide to organolithium compound. At a molar ratio of alkali metal alkoxide to organolithium compound which is within the range of about 0.1:1 to about 0.5:1, the glass transition temperature of the SBR increases and the 1,4-microstructure of the SBR decreases with increasing amounts of the alkali metal alkoxide. At a constant ratio of the alkali metal alkoxide to the organolithium initiator the glass transition temperature of the SBR increases with increasing levels of styrene incorporation.

At a constant styrene content the glass transition temperature and microstructure of the SBR can be controlled as desired to attain optimal benefits for a particular application. To synthesize a highly random SBR having a bound styrene content of about 20% with a low glass transition temperature (about −65° C. to about −60° C.) and a relatively low vinyl content (about 20% to about 25%), it is generally preferred for the molar ratio of the alkali metal alkoxide to the organolithium compound to be within the range of about 0.2:1 to about 0.4:1.

SBR made by the process of this invention will normally have a glass transition temperatures which is within the range of about −95° C. to about −50° C., a vinyl content which is within the range of about 10% to about 30%, and a 1,4-microstructure content of about 50% to about 75% at a bound styrene content of about 20 percent.

After the copolymerization has been completed, the styrene-butadiene rubber can be recovered from the organic solvent. The styrene-butadiene rubber can be recovered from the organic solvent and residue by any means, such as decantation, filtration, centrification and the like. It is often desirable to precipitate the styrene-butadiene rubber from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the styrene-butadiene rubber from the polymer cement also "kills" the living polymer by inactivating lithium end groups. After the rubber is recovered from the solution, steam stripping can be employed to reduce the level of volatile organic compounds in the styrene-butadiene rubber.

There are valuable benefits associated with utilizing the styrene-butadiene rubbers of this invention in making tire tread compounds. Tire tread compounds can be made using these styrene-butadiene rubbers without the need to blend additional rubbers therein. However, in many cases, it will be desirable to blend the styrene-butadiene rubber with one or more additional rubbers to attain the desired performance characteristics for the tire tread compound.

It is normally advantageous to utilize the SBR of this invention in blends with other rubbers in making tire tread compounds. Tire tread compounds which are particularly advantageous for utilization in high performance tires can be made by blending the SBR with natural rubber and high cis-1,4-polybutadiene rubber. Such blends exhibit excellent processability and low hysteresis. Tire tread compounds of this type will normally be comprised of about 45 weight percent to about 80 weight percent of the SBR, based upon the total amount of rubber in the blend. Such blends will preferably contain from about 50 weight percent to about 70 weight percent of the SBR. For instance, the SBR of this invention can be blended with natural rubber or synthetic polyisoprene and high cis-1,4-polybutadiene rubber in order to make tread compounds for passenger tires which exhibit outstanding handling and traction characteristics. Such blends will normally be comprised of about 45 weight percent to about 80 weight percent of the SBR, from about 15 weight percent to about 45 weight percent of the high cis-1,4-polybutadiene rubber, and from about 4 weight percent to about 10 weight percent of the natural rubber or synthetic polyisoprene. It is preferred for such blends to be comprised of about 50 weight percent to about 70 weight percent of the SBR, from about 24 weight percent to about 40 weight percent of the high cis-1,4-polybutadiene rubber, and from about 4 weight percent to about 10 weight percent of the natural rubber. High cis-1,4-polybutadiene which is suitable for use in such blends can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Budene® 1208 polybutadiene rubber.

The styrene-butadiene rubbers of this invention can be compounded utilizing conventional ingredients and standard techniques. For instance, the styrene-butadiene rubbers will typically be blended with carbon black and/or silica, sulfur, additional fillers, accelerators, oils, waxes, scorch inhibiting agents, coupling agents, and processing aids. In most cases, the styrene-butadiene rubber will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The IBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The styrene-butadiene rubber containing tire tread compounds of this invention can be used in tire treads in conjunction with ordinary tire manufacturing techniques. Tires are built utilizing standard procedures with the styrene-butadiene rubber simply being substituted for the rubber compounds typically used as the tread rubber. After the tire has been built with the styrene-butadiene rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to 18 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1-6

In this series of experiments SBR was synthesized in a one gallon (3.82 liter) reactor which had been previously cleaned and conditioned for anionic polymerization. In the procedure employed the reactor was charged with a premix of styrene and 1,3-butadiene in hexane. Polymerization was initiated with n-butyllithium and sodium amylate was utilized as a modifier. The polymerization temperature was maintained at 60° C. throughout the polymerizations.

In this series of experiments the ratio of sodium amylate (NaOAm) to n-butyllithium (BuLi) was varied from 0.1:1 to 2:1. The molar ratio of sodium amylate to n-butyllithium employed in each of these experiments is shown in Table I. Table I also shows the glass transition temperature (Tg) and the microstructure of the SBR produced.

TABLE I

| Example | NaOAm/BuLi | Tg | Block Sty[1] | Random Sty[1] | 1,2-PBd[2] | 1,4-PBd[2] |
| --- | --- | --- | --- | --- | --- | --- |
| 1 | 0.1/1 | −92° C. | 8% | 10% | 8% | 74% |
| 2 | 0.25/1 | −65° C. | — | 21% | 21% | 58% |
| 3 | 0.35/1 | −63° C. | — | 21% | 22% | 57% |
| 4 | 0.,5/1 | −51° C. | — | 21% | 31% | 48% |
| 5 | 1/1 | −47° C. | — | 20% | 38% | 42% |
| 6 | 2/1 | −51° C. | — | 20% | 34% | 46% |

[1]Sty is an abbreviation for styrene.
[2]PBd is an abbreviation for polybutadiene.

EXAMPLES 7-13

In this series of experiments the procedure utilized in Examples 1–6 was repeated except for the fact that the ratio of styrene to 1,3-butadiene in the monomer charge composition was increased to 30 styrene and 70 percent 1,3-butadiene. The SBR made in this series of experiments is characterized in Table II.

TABLE II

| Example | NaOAm/BuLi | Tg | Block Sty[1] | Random Sty[1] | 1,2 PBd[2] | 1,4-PBd[2] |
| --- | --- | --- | --- | --- | --- | --- |
| 7 | 0.25/1 | −64° C. | 2% | 27% | 16% | 55% |
| 8 | 0.35/1 | −56° C. | — | 31% | 18% | 52% |
| 9 | 0.5/1 | −44° C. | — | 30% | 24% | 46% |
| 10 | 0.75/1 | −41° C. | — | 31% | 26% | 44% |
| 11 | 1/1 | −35° C. | — | 31% | 33% | 36% |
| 12 | 2/1 | −40° C. | — | 31% | 27% | 42% |
| 13 | 3/1 | −39° C. | — | 30% | 30% | 40% |

[1]Sty is an abbreviation for styrene.
[2]PBd is an abbreviation for polybutadiene.

EXAMPLES 14-18

In this series of experiments the procedure utilized in Examples 1–6 was repeated except for the fact that the ratio of styrene to 1,3-butadiene in the monomer charge composition was increased to 40 percent styrene and 60 percent 1,3-butadiene. The SBR made in this series of experiments is characterized in Table III.

TABLE III

| Example | NaOAm/BuLi | Tg | Block Sty[1] | Random Sty[1] | 1,2-PBd[2] | 1,4-PBd[2] |
| --- | --- | --- | --- | --- | --- | --- |
| 14 | 0.25/1 | −52° C. | 4% | 35% | 14% | 47% |
| 15 | 0.35/1 | −53° C. | 3% | 31% | 17% | 49% |
| 16 | 0.5/1 | −33° C. | — | 38% | 22% | 40% |
| 17 | 1/1 | −30° C. | — | 40% | 26% | 34% |
| 18 | 2/1 | −35° C. | — | 40% | 23% | 37% |

[1]Sty is an abbreviation for styrene.
[2]PBd is an abbreviation for polybutadiene.

EXAMPLE 19

Styrene-isoprene-butadiene rubber (SIBR) can also be synthesized by utilizing the techniques of this invention. The procedure employed in making SIBR is the same as is utilized in making SBR except, of course, for the fact that isoprene monomer is included in the monomer charge composition. The monomer charge composition utilized in the synthesis of the SIBR will typically contain from about 30 weight percent to about 55 weight percent styrene, from about 5 weight percent to about 65 weight percent isoprene, and from about 5 weight percent to about 65 weight percent 1,3-butadiene. The monomer charge composition will more typically contain from about 35 weight percent to about 45 weight percent styrene, from about 5 weight percent to about 15 weight percent isoprene, and from about 45 weight percent to about 55 weight percent 1,3-butadiene.

In this experiment a SIBR was synthesized utilizing the technique of this invention. The procedure employed was the same as the technique used in Examples 1–6 except that the monomer charge composition contained 40 percent styrene, 10 percent isoprene, 50 percent 1,3-butadiene. The ratio of sodium amylate to n-butyllithium utilized was 2:1. The SIBR made was determined to have a glass transition temperature of −36° C. It was also determined to have a microstructure which contained 3 percent styrene blocks, 37 percent random styrene, 15 percent 1,2-polybutadiene, 22 percent 1,4-polybutadiene, 7 percent 3,4-polyisoprene, and 16 percent 1,4-polyisoprene. The SIBR made was soluble in the n-hexane solvent even though it contained 40 percent styrene.

EXAMPLE 20

Styrene-isoprene rubber (SIR) can also be synthesized by utilizing the techniques of this invention. The procedure employed in making SIR is the same as is utilized in making SBR except that isoprene monomer is substituted in the monomer charge composition for the 1,3-butadiene monomer. Accordingly, the monomer charge composition utilized in the synthesis of the SIR will typically contain from about 30 weight percent to about 55 weight percent styrene and from about 45 weight percent to about 70 weight percent isoprene. The monomer charge composition will more typically contain from about 35 weight percent to about 50 weight percent styrene and from about 50 weight percent to about 65 weight percent isoprene.

In this experiment a SIR was synthesized utilizing the technique of this invention. The procedure employed was the same as the technique used in Examples 1–6 except that the monomer charge composition contained 30 percent styrene and 70 percent isoprene. The ratio of sodium amylate to n-butyllithium utilized was 2:1. The SIR made was determined to have a glass transition temperature of −26° C. It was also determined to have a microstructure which contained 10 percent styrene blocks, 20 percent random styrene, 4 percent 1,2-polyisoprene, 34 percent 3,4-polyisoprene, and 32 percent 1,4-polyisoprene. The SIR made was soluble in the n-hexane solvent eventhough it contained 30 percent styrene.

Variations in the present invention are possible in light of the description of it provided herein. It is, therefore, to be understood that changes can be made in the particular embodiments described which will be in the full intended scope of the invention as defined by the following appended claims.

What is claimed is:

1. A process for preparing a rubbery copolymer of styrene and isoprene having an excellent combination of properties for use in making tire treads by a solution polymerization process which comprises copolymerizing from 35 weight percent to about 50 weight percent styrene and from about 50 weight percent to 65 weight percent isoprene in n-hexane solvent at a temperature which is within the range of about 50° C. to about 80° C. in the presence of (a) a sodium alkoxide and (b) an organolithium compound which is of the formula R—Li wherein R represents a hydrocarbyl radical containing from 1 to about 20 carbon atoms, wherein the molar ratio of the sodium alkoxide to the organolithium compound is within the range of about 0.01:1 to about 1:1.

2. A process for preparing a rubbery polymer having an excellent combination of properties for use in making tire treads by a solution polymerization process which comprises polymerizing from 35 weight percent to about 50 weight percent styrene and from about 50 weight percent to 65 weight percent 1,3-butadiene in n-hexane solvent at a temperature which is within the range of about 50° C. to about 80° C. in the presence of (a) a sodium alkoxide and (b) an organolithium compound which is of the formula R—Li wherein R represents a hydrocarbyl radical containing from 1 to about 20 carbon atoms, wherein the molar ratio of the sodium alkoxide to the organolithium compound is within the range of about 0.01:1 to about 1:1.

3. A process as specified in claim 2 wherein the sodium alkoxide is of the formula NaOr, wherein Na represents sodium and wherein R represents an alkyl group containing from about 2 to about 12 carbon atoms.

4. A process as specified in claim 3 wherein R represents an alkyl group containing from about 3 to about 8 carbon atoms.

5. A process as specified in claim 4 wherein from about 0.01 phm to about 1 phm of the lithium initiator is employed.

6. A process as specified in claim 5 wherein R represents an alkyl group containing from about 4 to about 6 carbon atoms.

7. A process as specified in claim 6 wherein the molar ratio of the sodium alkoxide to the organolithium compound is within the range of about 0.1:1 to about 0.5:1.

8. A process as specified in claim 7 wherein the sodium alkoxide is sodium t-amylate.

9. A process as specified in claim 2 which further comprises polymerizing isoprene to produce a styrene-isoprene-butadiene rubber.

10. A process as specified in claim 1 wherein the molar ratio of the sodium alkoxide to the organolithium compound is within the range of about 0.1:1 to about 0.5:1.

* * * * *